US012610229B2

(12) United States Patent
Newman et al.

(10) Patent No.: US 12,610,229 B2
(45) Date of Patent: Apr. 21, 2026

(54) DIFFERENTIAL ANALYSIS OF NAVIGATION SATELLITE SIGNALS BY 5G/6G MESSAGING

(71) Applicants:David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 294 days.

(21) Appl. No.: 18/376,206

(22) Filed: Oct. 3, 2023

(65) Prior Publication Data

US 2024/0031797 A1      Jan. 25, 2024

Related U.S. Application Data

(63) Continuation of application No. 18/106,710, filed on Feb. 7, 2023, now Pat. No. 11,812,510, which is a
(Continued)

(51) Int. Cl.
*H04W 8/26* (2009.01)
*G01S 5/00* (2006.01)
(Continued)

(52) U.S. Cl.
CPC ............. *H04W 8/26* (2013.01); *G01S 5/0063* (2013.01); *G01S 19/256* (2013.01);
(Continued)

(58) Field of Classification Search
CPC ...... G01S 13/08; G01S 5/0063; G01S 19/256; H04W 4/023; H04W 4/40; H04W 4/44;
H04W 4/027; H04W 4/46; H04W 8/26; H04W 4/029; H04W 4/90; G06K 19/06037; G08G 1/0145; G08G 1/017; G08G 1/04; G08G 1/056; G08G 1/091; G08G 1/137;
(Continued)

(56) References Cited

U.S. PATENT DOCUMENTS 6,249,252 B1    6/2001  Dupray
6,813,500 B1   11/2004  Ciganer
(Continued)

FOREIGN PATENT DOCUMENTS

WO      WO-2020110229 A1 *  6/2020   ............... G08G 1/16

*Primary Examiner* — Dung Hong

(57)      ABSTRACT

In traffic, vehicle safety generally depends on the relative separation between two vehicles, and not at all on their absolute geographical positions. Therefore, methods are disclosed for determining the relative separation differentially. Two vehicles simultaneously acquire the same satellite signals, reduce the signals to data, and then transmit the data, preferably with fast 5G or 6G, to one of the vehicles or to a roadside access point. A computer then analyzes the data based on differences between the two sets of signals, thereby determining the separation distance and angle between the two vehicles. Other vehicles within range can do the same. The relative locations of all the participating vehicles can then be broadcast, in the form of a table or a map, to all the vehicles in proximity. Improved position measurements can enable collision avoidance and harm minimization in traffic.

5 Claims, 6 Drawing Sheets

701 - First vehicle, in traffic, broadcasts planning message specifying time and satellites to acquire signals.

702 - Other vehicles receiving the planning message transmit acknowledgements, then acquire satellite signals as specified.

703 - Each vehicle measures a parameter of the acquired signals such as timing or phase.

704 - Each vehicle transmits a data message to the first vehicle indicating the parameter, other data, and vehicle's wireless address.

705 - First vehicle analyzes the various data sets, along with its own GPS signals, and determines differential locations of each vehicle. Redundant measurements may be averaged or fitted.

706 - First vehicle broadcasts a location message listing the coordinates and wireless addresses of each participating vehicle.

707 - After receiving the location message, each vehicle continues to observe surrounding traffic and track vehicle motions.

708 - At a later time, a third vehicle detects an imminent hazard involving a fourth vehicle. Based on the location message, third vehicle determines the wireless address of the fourth vehicle.

709 - Third vehicle transmits an emergency message to the fourth vehicle, coordinating a mitigation response to the hazard.

710 - Fourth vehicle performs the mitigation response as directed, and a life-threatening collision is avoided.

Related U.S. Application Data continuation of application No. 17/858,203, filed on Jul. 6, 2022, now Pat. No. 11,582,598, which is a continuation of application No. 17/583,386, filed on Jan. 25, 2022, now Pat. No. 11,402,513.

(60) Provisional application No. 63/290,731, filed on Dec. 17, 2021, provisional application No. 63/288,807, filed on Dec. 13, 2021, provisional application No. 63/288,237, filed on Dec. 10, 2021, provisional application No. 63/287,428, filed on Dec. 8, 2021, provisional application No. 63/272,352, filed on Oct. 27, 2021, provisional application No. 63/271,335, filed on Oct. 25, 2021, provisional application No. 63/256,042, filed on Oct. 15, 2021, provisional application No. 63/246,000, filed on Sep. 20, 2021, provisional application No. 63/245,227, filed on Sep. 17, 2021, provisional application No. 63/243,437, filed on Sep. 13, 2021, provisional application No. 63/260,814, filed on Sep. 1, 2021.

(51) Int. Cl.

| | |
|---|---|
| *G01S 19/25* | (2010.01) |
| *G06K 19/06* | (2006.01) |
| *G08G 1/01* | (2006.01) |
| *G08G 1/017* | (2006.01) |
| *G08G 1/04* | (2006.01) |
| *G08G 1/056* | (2006.01) |
| *G08G 1/09* | (2006.01) |
| *G08G 1/137* | (2006.01) |
| *G08G 1/16* | (2006.01) |
| *H04W 4/029* | (2018.01) |
| *H04W 4/40* | (2018.01) |
| *H04W 4/46* | (2018.01) |
| *H04W 4/90* | (2018.01) |

(52) U.S. Cl.
CPC ..... *G06K 19/06037* (2013.01); *G08G 1/0145* (2013.01); *G08G 1/017* (2013.01); *G08G 1/04* (2013.01); *G08G 1/056* (2013.01); *G08G 1/091* (2013.01); *G08G 1/137* (2013.01); *G08G 1/161* (2013.01); *G08G 1/162* (2013.01); *G08G 1/166* (2013.01); *G08G 1/167* (2013.01); *H04W 4/029* (2018.02); *H04W 4/40* (2018.02); *H04W 4/46* (2018.02); *H04W 4/90* (2018.02)

(58) Field of Classification Search
CPC ........ G08G 1/161; G08G 1/162; G08G 1/166; G08G 1/167
See application file for complete search history.

(56) References Cited

U.S. PATENT DOCUMENTS

| | | | |
|---|---|---|---|
| 8,520,695 B1 | 8/2013 | Rubin | |
| 9,558,667 B2 * | 1/2017 | Bowers | G08G 1/16 |
| 10,611,383 B2 * | 4/2020 | Bae | G08G 1/167 |
| 10,705,542 B1 * | 7/2020 | Kimchi | G01S 5/0264 |
| 11,273,806 B2 * | 3/2022 | Liu | B60T 8/172 |
| 11,510,026 B2 * | 11/2022 | Ivanov | G01S 5/16 |
| 11,543,263 B1 * | 1/2023 | Bosse | G05D 1/027 |
| 2002/0022927 A1 * | 2/2002 | Lemelson | G01S 19/11 340/436 |
| 2004/0068393 A1 * | 4/2004 | Lawrence | G08G 1/096775 702/183 |
| 2006/0047418 A1 | 3/2006 | Metzler | |
| 2009/0140887 A1 * | 6/2009 | Breed | G01C 21/1656 701/116 |
| 2010/0256852 A1 * | 10/2010 | Mudalige | G08G 1/163 701/24 |
| 2011/0261805 A1 | 10/2011 | Landry | |
| 2012/0112895 A1 * | 5/2012 | Jun | G01S 5/0247 340/435 |
| 2013/0084884 A1 * | 4/2013 | Teyeb | H04W 48/04 455/456.1 |
| 2013/0203400 A1 | 8/2013 | Ricci | |
| 2016/0077213 A1 | 3/2016 | Xianglin | |
| 2017/0018187 A1 * | 1/2017 | Kim | G08G 1/005 |
| 2017/0146660 A1 | 5/2017 | Xu | |
| 2017/0176599 A1 | 6/2017 | Hay | |
| 2017/0212510 A1 | 7/2017 | Nordbruch | |
| 2017/0285176 A1 | 10/2017 | Croyle | |
| 2018/0113472 A1 | 4/2018 | Sakr | |
| 2018/0160419 A1 * | 6/2018 | Jiang | G01S 5/0027 |
| 2018/0208140 A1 | 7/2018 | Sugimoto | |
| 2018/0292836 A1 * | 10/2018 | Laur | G05D 1/0061 |
| 2018/0328734 A1 | 11/2018 | Kasslatter | |
| 2018/0341264 A1 * | 11/2018 | Knych | H04L 67/52 |
| 2019/0069051 A1 | 2/2019 | Al-Stouhi | |
| 2019/0094385 A1 | 3/2019 | Laurichesse | |
| 2019/0239040 A1 | 8/2019 | Va | |
| 2019/0317225 A1 * | 10/2019 | Ewert | G01S 19/396 |
| 2020/0025858 A1 | 1/2020 | Stahlin | |
| 2020/0041604 A1 | 2/2020 | Kim | |
| 2020/0049513 A1 * | 2/2020 | Ma | G06V 20/588 |
| 2020/0117206 A1 * | 4/2020 | Egnor | B60W 30/0953 |
| 2020/0150285 A1 * | 5/2020 | Cvijetic | G01S 19/47 |
| 2020/0178039 A1 | 6/2020 | Lee | |
| 2020/0216025 A1 * | 7/2020 | Le Bourgeois | B60R 25/241 |
| 2020/0336541 A1 | 10/2020 | Alizadeh | |
| 2020/0342760 A1 * | 10/2020 | Vassilovski | B60W 30/18159 |
| 2020/0389469 A1 | 12/2020 | Litichever | |
| 2021/0018630 A1 | 1/2021 | Mueller | |
| 2021/0096215 A1 | 4/2021 | Slobodyanyuk | |
| 2021/0132233 A1 | 5/2021 | Govindillam | |
| 2021/0150895 A1 * | 5/2021 | Huang | G06V 20/56 |
| 2021/0168564 A1 | 6/2021 | Liu | |
| 2021/0243555 A1 | 8/2021 | Reed | |
| 2021/0263165 A1 * | 8/2021 | Zheng | G01S 19/43 |
| 2021/0263166 A1 * | 8/2021 | Zheng | G01S 19/396 |
| 2021/0286044 A1 | 9/2021 | Knuuttila | |
| 2021/0311203 A1 | 10/2021 | Reis | |
| 2021/0318139 A1 | 10/2021 | Loch | |
| 2021/0318450 A1 | 10/2021 | Tomita | |
| 2021/0341631 A1 | 11/2021 | Liu | |
| 2021/0356279 A1 | 11/2021 | Szigeti | |
| 2021/0377760 A1 | 12/2021 | Guo | |
| 2022/0005353 A1 | 1/2022 | Hwang | |
| 2022/0043099 A1 * | 2/2022 | Da | H04L 5/0048 |
| 2022/0107190 A1 | 4/2022 | Kotab | |
| 2022/0353673 A1 | 11/2022 | Newman | |
| 2022/0386093 A1 * | 12/2022 | Baek | H04W 76/14 |

* cited by examiner

Figure 7:
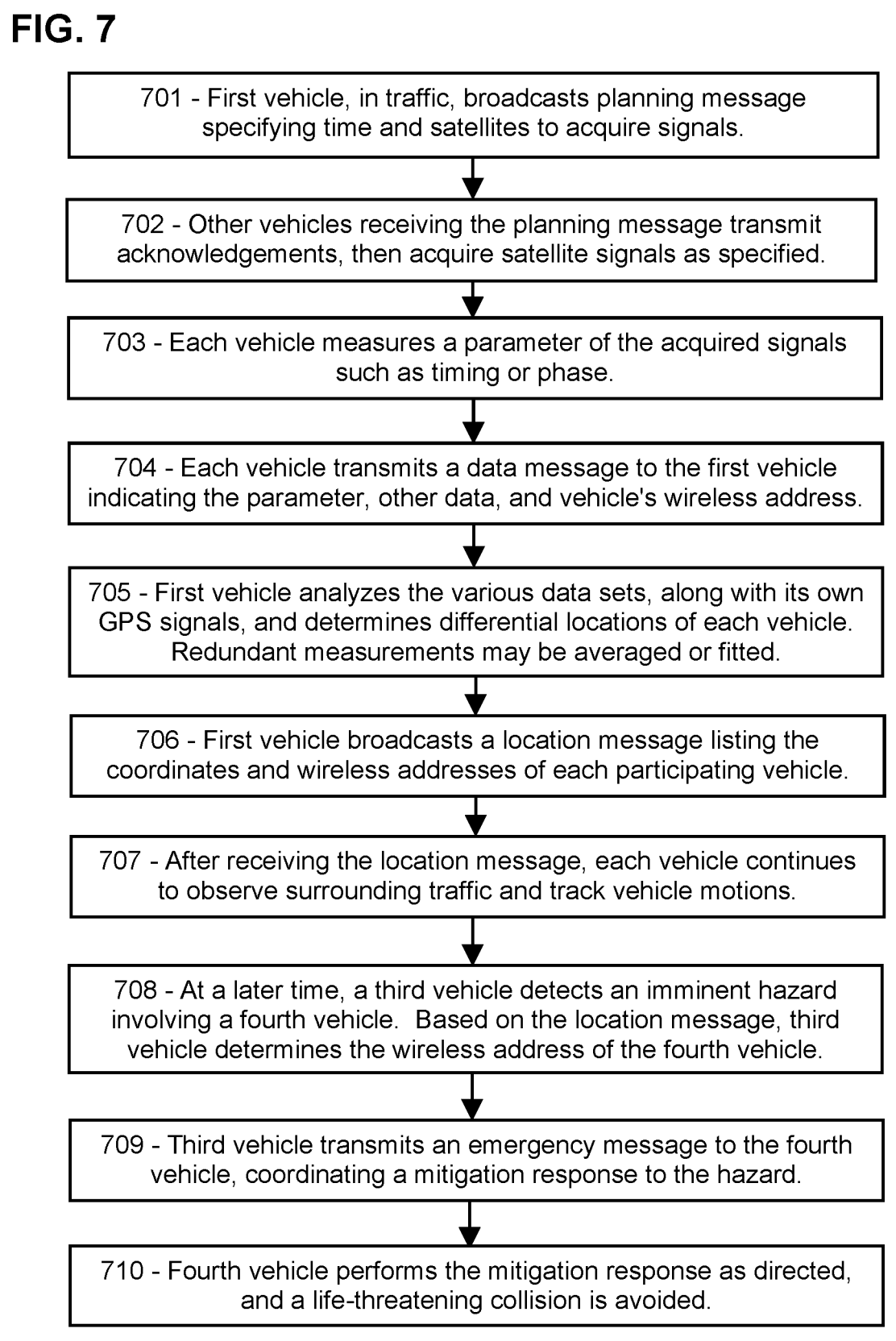

701 - First vehicle, in traffic, broadcasts planning message specifying time and satellites to acquire signals.

↓

702 - Other vehicles receiving the planning message transmit acknowledgements, then acquire satellite signals as specified.

↓

703 - Each vehicle measures a parameter of the acquired signals such as timing or phase.

↓

704 - Each vehicle transmits a data message to the first vehicle indicating the parameter, other data, and vehicle's wireless address.

↓

705 - First vehicle analyzes the various data sets, along with its own GPS signals, and determines differential locations of each vehicle. Redundant measurements may be averaged or fitted.

↓

706 - First vehicle broadcasts a location message listing the coordinates and wireless addresses of each participating vehicle.

↓

707 - After receiving the location message, each vehicle continues to observe surrounding traffic and track vehicle motions.

↓

708 - At a later time, a third vehicle detects an imminent hazard involving a fourth vehicle. Based on the location message, third vehicle determines the wireless address of the fourth vehicle.

↓

709 - Third vehicle transmits an emergency message to the fourth vehicle, coordinating a mitigation response to the hazard.

↓

710 - Fourth vehicle performs the mitigation response as directed, and a life-threatening collision is avoided.

DIFFERENTIAL ANALYSIS OF NAVIGATION SATELLITE SIGNALS BY 5G/6G MESSAGING

PRIORITY CLAIMS AND RELATED APPLICATIONS

This application is a continuation of U.S. patent application Ser. No. 18/106,710, entitled "Methods for Rapid, Precision Position Determination in 5G/6G", filed Feb. 7, 2023, which is a continuation of U.S. patent application Ser. No. 17/858,203, entitled "Precision Localization of Mobile G5/G6 Terminals by Coordinated GNSS Reception", filed Jul. 6, 2022, which is a continuation of U.S. patent application Ser. No. 17/583,386, entitled "V2X Messaging in 5G/6G with Simultaneous GPS Reception", filed Jan. 25, 2022, which claims the benefit of U.S. Provisional Patent Application Ser. No. 63/260,814, entitled "Localization and Identification of Vehicles in Traffic by 5G Messaging", filed Sep. 1, 2021, and U.S. Provisional Patent Application Ser. No. 63/243,437, entitled "V2X Messaging in 5G with Simultaneous GPS Reception", filed Sep. 13, 2021, and U.S. Provisional Patent Application Ser. No. 63/245,227, entitled "V2X with 5G Image Exchange and AI-Based Viewpoint Fusion", filed Sep. 17, 2021, and U.S. Provisional Patent Application Ser. No. 63/246,000, entitled "V2X Connectivity Matrix with 5G Sidelink", filed Sep. 20, 2021, and U.S. Provisional Patent Application Ser. No. 63/256,042, entitled "Hailing Procedure for V2R, V2V and V2X Initial Contact in 5G", filed Oct. 15, 2021, and U.S. Provisional Patent Application Ser. No. 63/271,335, entitled "Semaphore Messages for Rapid 5G and 6G Network Selection", filed Oct. 25, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/287,428, entitled "V2X and Vehicle Localization by Local Map Exchange in 5G/6G", filed Dec. 8, 2021, and U.S. Provisional Patent Application Ser. No. 63/288,237, entitled "V2X with 5G/6G Image Exchange and AI-Based Viewpoint Fusion", filed Dec. 10, 2021, and U.S. Provisional Patent Application Ser. No. 63/288,807, entitled "V2X Messaging in 5G/6G with Simultaneous GPS Reception", filed Dec. 13, 2021, and U.S. Provisional Patent Application Ser. No. 63/290,731, entitled "Vehicle Connectivity, V2X Communication, and 5G/6G Sidelink Messaging", filed Dec. 17, 2021, all of which are hereby incorporated by reference in their entireties.

FIELD OF THE INVENTION

The invention relates to systems and methods for localizing wireless entities by satellite-based navigation signals.

BACKGROUND OF THE INVENTION

Vehicles and other mobile wireless terminals are expected to cooperate in managing traffic and other benefits in 5G and 6G. However, such cooperation generally requires that each communicating user be localized, by identifying each terminal and its wireless address among other users in vicinity. Prior art includes a variety of GNSS (global navigational satellite system) methods for determining positions, but it is generally difficult for moving vehicles to obtain a spatial resolution better than a few meters due to motional errors in the satellite signals. For example, the spatial resolution may be limited due to the motion of the vehicle while acquiring signals from multiple satellites, preventing the averaging of successive acquisitions, among other error sources. Many promising and valuable applications are thereby inhibited, if not prevented altogether.

What is needed is means for a vehicle in motion to determine its location, and thereby the positions of proximate vehicles, and other roadside transmitters, with improved precision.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a roadside access point of a wireless network, the roadside access point comprising non-transitory computer-readable media containing instructions that, when executed by a computer environment in the roadside access point, cause a method to be performed, the method comprising: broadcasting a planning message, the planning message specifying one or more particular navigation satellites, a particular time for acquiring signals from the particular navigation satellites, and a wireless address of the roadside access point; acquiring, at the particular time, from the particular navigation satellites, a first set of the navigation satellite signals; receiving, from a vehicle, a data message comprising a wireless address of the vehicle and data related to a second set of the navigation satellite signals, the second set of the navigation satellite signals acquired by the vehicle at the particular time from the particular navigation satellites; and determining, according to the first set of navigation satellite signals and the data related to the second set of navigation satellite signals, a relative position of the vehicle, relative to a location of the roadside access point at the particular time.

In another aspect, there is a method for a processor comprising an AI (artificial intelligence) model to determine a distance between vehicles, the method comprising: selecting, by a first vehicle, a plurality of times and frequencies according to a planned transmission schedule of a global navigation satellite system; transmitting, by the first vehicle, to a second vehicle, a planning message specifying the plurality of times and frequencies; acquiring, by the first and second vehicles, simultaneously, at times and frequencies according to the plurality of times and frequencies, navigation satellite signals; transmitting, by the second vehicle, measurement data derived from the navigation satellite signals; and determining, by the AI model, according to the navigation satellite signals acquired by the first vehicle and the measurement data transmitted by the second vehicle, a two-dimensional position of the second vehicle relative to the first vehicle.

In another aspect, there is a method for a first vehicle to determine a location of a second vehicle, the method comprising: synchronizing a clock of the first vehicle with a clock of the second vehicle; simultaneously, at a predetermined time, acquiring a first set of navigation satellite signals and determining a first value of a parameter of the signals; receiving, from the second vehicle, a data message comprising a second value of the parameter, the second value determined according to a second set of navigation satellite signals acquired by the second vehicle at the predetermined time; and determining, according to the first value and the second value, a location of the second vehicle relative to the first vehicle.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 7 is a flowchart showing an exemplary embodiment of a procedure for vehicles to avoid a collision, according to some embodiments.

Like reference numerals refer to like elements throughout.

DETAILED DESCRIPTION

Figure 1:
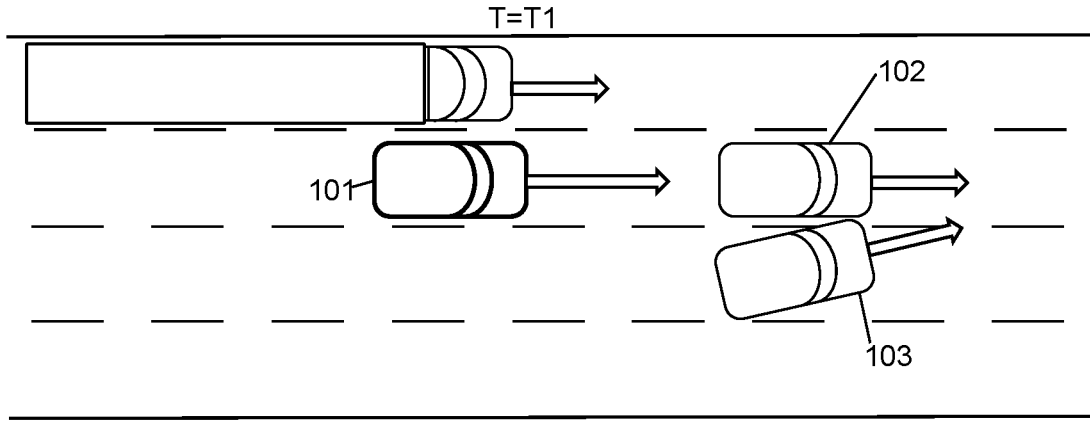
FIG. 1 is a sketch showing a vehicle collision, according to prior art.
Figure 1:
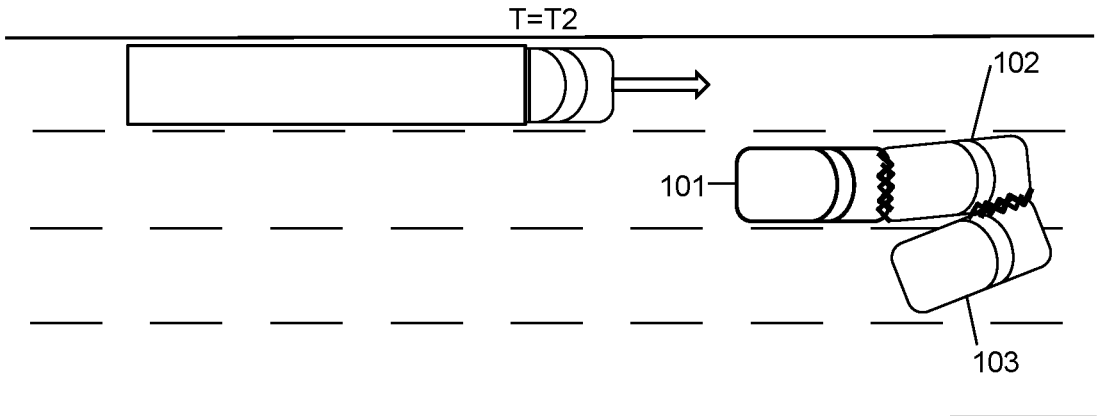

Disclosed herein are procedures enabling vehicles in traffic to determine the locations of other proximate vehicles, as well as non-vehicle transmitters such as pedestrians, toll booths, safety gates, roadside access points, and the like. Systems and methods disclosed herein (the "systems" and "methods", also occasionally termed "embodiments" or "arrangements", generally according to present principles) can provide urgently needed wireless communication protocols to reduce traffic fatalities, facilitate traffic flow, and provide V2V and V2X communication options appropriate for 5G and 6G technologies, according to some embodiments.

As disclosed in more detail below, vehicles in motion can determine the relative locations of other vehicles or wireless entities, relative to each other, with improved precision by synchronizing their reception of satellite navigation signals. One of the vehicles, or a roadside access point, can broadcast a planning message specifying a particular time at which the vehicles will acquire the same signals from the same satellites simultaneously. The participating vehicles then transmit their raw data to the planning entity, which can then analyze the signals differentially. The planning entity thereby determines the relative distances between the vehicles, as opposed to calculating their global coordinates. The differential analysis and simultaneous acquisitions may cause major uncertainties to cancel. For example, by acquiring the same satellite signals at the same time, the participating entities can negate, or greatly reduce, errors due to the relative motion of the vehicles, satellite ephemeris and clock errors, atmospheric propagation errors, and others. The planning entity can correlate the various arrival-time parameters and optionally the signal phases, and can then analyze the data differentially to determine the distance between the vehicles at the time of data acquisition. Due to the simultaneous acquisition, and resulting cancellation of certain errors, the cooperating entities can determine the distances between them more precisely than by separately acquiring geographical coordinates, according to some embodiments. Various resolution-improving schemes such as "precise point positioning" generally rely on extensive averaging including multiple acquisitions of satellite data, spanning minutes to hours, and thus are not feasible when the vehicles are traveling in traffic.

In one embodiment, vehicles in traffic may exchange messages agreeing to acquire navigation signals, from certain specified satellites, at a specified time, and to exchange data based on the signals thus acquired, as well as their wireless addresses. The vehicles (or one of them, or a roadside processor) can then analyze the two sets of data to determine the position of each vehicle relative to the others, including distances between the vehicles. The vehicles (or the planning entity) can then broadcast the calculation results as a position map or coordinate listing, including the wireless addresses of the participating vehicles. The participating vehicles, or any other entities receiving the positon map or listing, can then determine which vehicles in traffic have which wireless addresses, so that the vehicles can communicate with each other thereafter.

With primary sources of error canceled or reduced according to the simultaneous acquisitions and the differential analysis, the vehicles may obtain improved spatial resolution, such as a resolution of less than 1 meter in the relative distances and locations, in some embodiments. Such precise locations may enable vehicles to identify specific other vehicles in dense traffic, and thereby to communicate with another vehicle individually, thereby allowing them to cooperate in ways not possible absent the specific identification and localization of the vehicles. For example, the vehicles can cooperate more effectively to avoid collisions and to facilitate efficient flow of traffic. In addition, the precise location data may enable collision-avoidance software to calculate trajectories more accurately, discriminate near-miss events from imminent collisions more accurately, and devise mitigation strategies more accurately than possible without the high-resolution location results.

Following are examples of traffic situations in which lives can be saved by improved vehicle location determination.

FIG. 1 is a sketch showing a vehicle collision, according to prior art. A four-lane highway 100 is shown at three times T0, T1, and T2, occupied by a first, second, and third vehicle 101-102-103 depicted as cars, and a semi-trailer 104. All vehicles are traveling to the right, as indicated by arrows. The first vehicle 101 is outlined in bold to indicate that it is the one transmitting. All three cars 101-103 are autonomous vehicles and all are in radio contact with each other on a sidelink or V2V channel.

At T0, the first vehicle 101 recognizes that it is traveling too fast and is likely to hit the second vehicle 102. The first vehicle 101 cannot switch to the left lane because the truck 104 is in the way. It doesn't make sense to shift to the right because then the third vehicle 103 is in the way, and there is no time to reach the rightmost lane. Therefore vehicle 101 transmits an emergency message, intended for the second vehicle 102, instructing it to immediately and forcefully shift to the left, to avoid a collision. Unfortunately, the first vehicle 101 has incorrectly determined the wireless address of the second vehicle due to the poor spatial resolution of GPS and the poor angular precision of directional beamforming. The wireless address which the first vehicle 101 thinks belongs to the second vehicle 102, instead belongs to the third vehicle 103. Therefore, when the first vehicle 101 transmitted the collision-avoidance instruction, it was actually addressed to the third vehicle 103 instead of the second vehicle 102. Consequently, at T1 the third vehicle 103 immediately performs the instructed left-turn emergency maneuver, and strikes the second vehicle 102. At T3, the first vehicle 101 collides with the second vehicle 102 since the second vehicle 102 is still blocking the way. All three vehicles are badly damaged, as indicated by crunch marks. In fact, they will be lucky if they avoid being hit again by the approaching truck 104. The cause of the collision was the mistaken determination, by the first vehicle 101, of which of the second and third vehicles 102, 103 had which wireless address. The ultimate source of the collision was the insufficient spatial resolution of GPS which often cannot reliably discriminate two adjacent vehicles traveling at high speed on a freeway.

Figure 2:
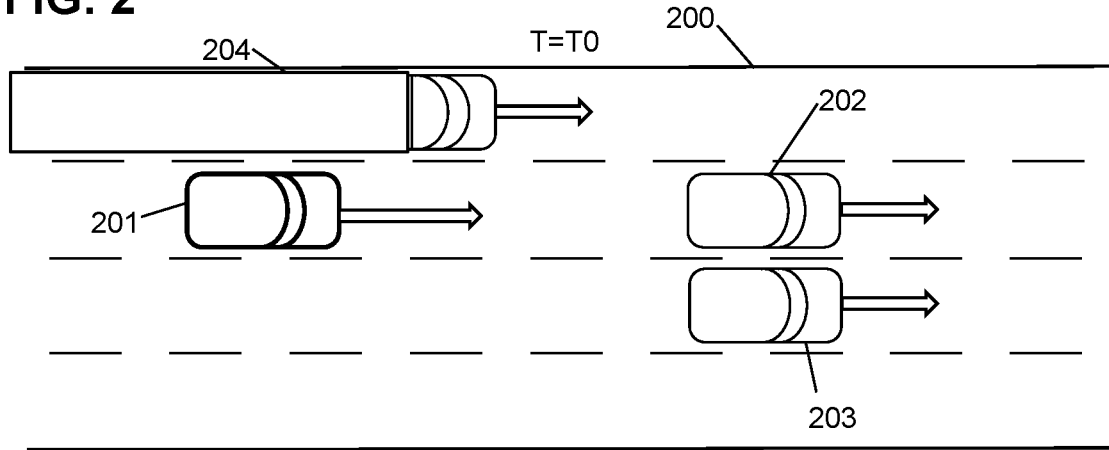
FIG. 2 is a sketch showing an exemplary embodiment of a procedure for vehicles to avoid a collision, according to some embodiments.
Figure 2:
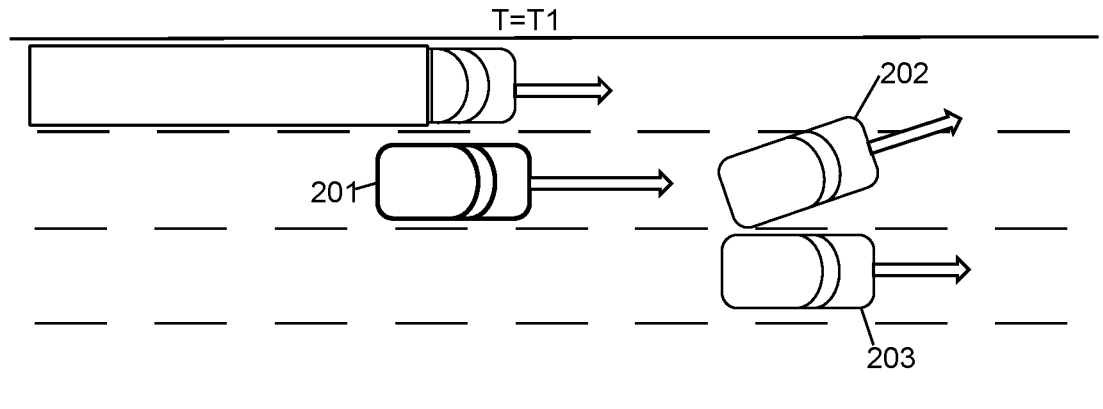
Figure 2:
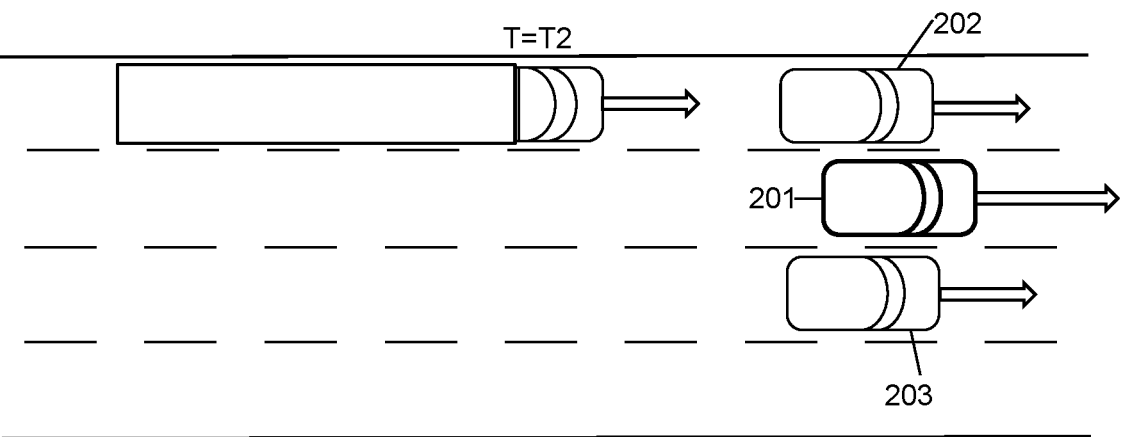

FIG. 2 is a sketch showing an exemplary embodiment of a procedure for vehicles to avoid a collision, according to some embodiments. As depicted in this non-limiting example, the freeway 200, first second and third vehicles 201-202-203 and the truck 204 are as described with FIG. 1, however this time the first vehicle 201 exchanged messages with the second vehicle 202 according to the systems and methods disclosed herein, and therefore has determined the correct wireless addresses for the second and third vehicles 202-203. At T0, the first vehicle 201 transmits the emergency collision-avoidance message for an immediate left shift, but this time using the correct wireless address of the second vehicle 202. Accordingly, at T1, the second vehicle 202 dodges left into the leftmost lane. At T2, the second vehicle has completed the change, and the first vehicle passes safely through the gap. The third vehicle 203 then sends the first vehicle 201 a message expressing gratitude for using an effective technology to correctly identify and localize each vehicle, instead of relying on an ineffective means for determining which wireless address belongs to which vehicle.

Figure 3:
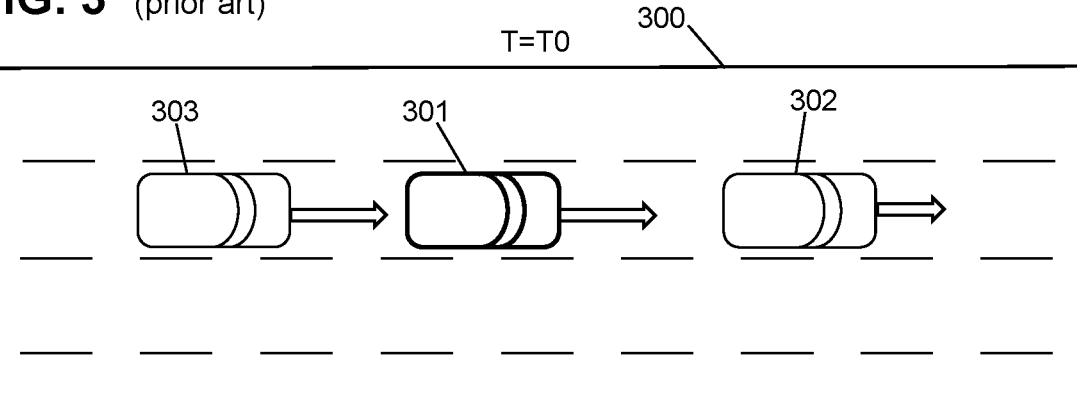
FIG. 3 is a sketch showing three vehicles colliding, according to prior art.
Figure 3:
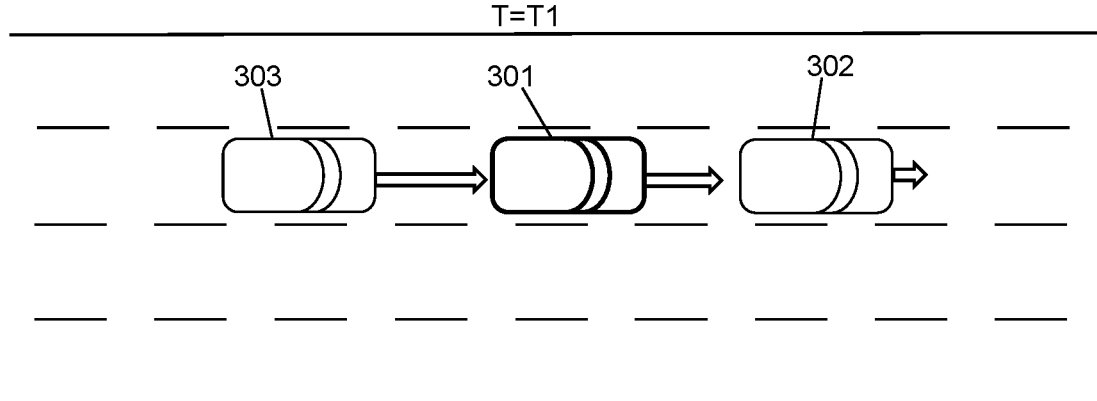
Figure 3:
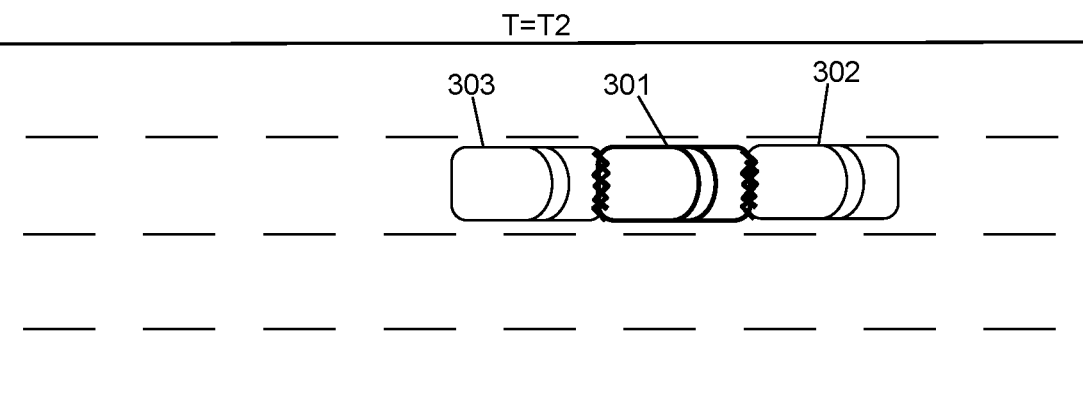

FIG. 3 is a sketch showing three vehicles colliding, according to prior art. A highway 300 includes a first, second, and third vehicle 301-302-303 in line. At T0, the first vehicle determines that it is traveling faster than the second vehicle 302 and immediately begins to slow down. To avoid being rear-ended by the third vehicle 303, the first vehicle 301 transmits an emergency message "slow down immediately!" to the wireless address that the first vehicle 301 thinks belongs to the third vehicle 303, and another emergency message "speed up immediately" to the wireless address that the first vehicle 301 thinks belongs to the second vehicle 302. Unfortunately, in this case those addresses were misallocated, and they actually belong to the opposite vehicles. The error is due to the poor longitudinal resolution achievable in a moving GPS receiver. Consequently, the third vehicle 303 received an emergency command to speed up and the second vehicle 302 got an emergency command to slow down.

At T1, the second vehicle 302 has obligingly slowed down further, as directed by the emergency message it mistakenly received, while the third vehicle 303 has accelerated to high speed, as instructed in its mistaken message. At T2, the first vehicle 301 has smashed into the second vehicle 302 and the third vehicle 303 has smashed into the first vehicle 301. The cause of this accident was that the first vehicle 301 had misallocated the wireless addresses to the two other vehicles, resulting in sending the emergency messages to the wrong vehicles. The ultimate source was the poor longitudinal resolution of satellite-based locations when moving at high speed.

Figure 4:
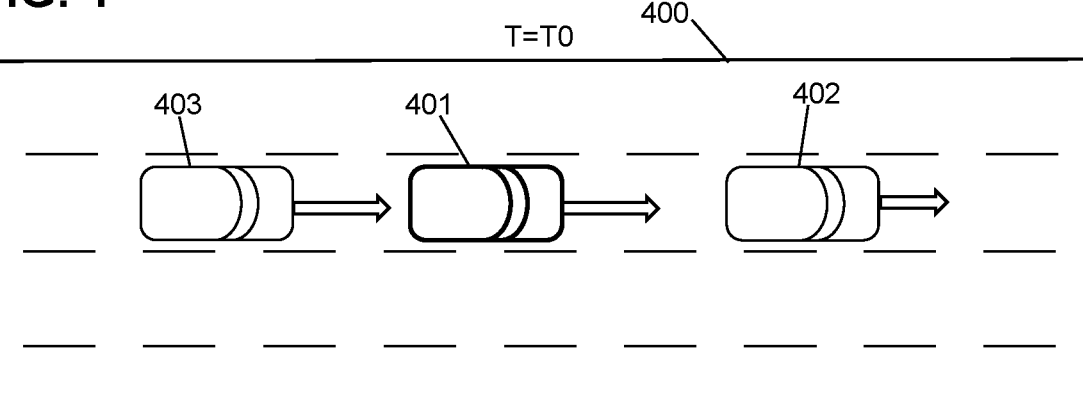
FIG. 4 is a sketch showing an exemplary embodiment of a procedure for three vehicles to avoid a collision, according to some embodiments.
Figure 4:
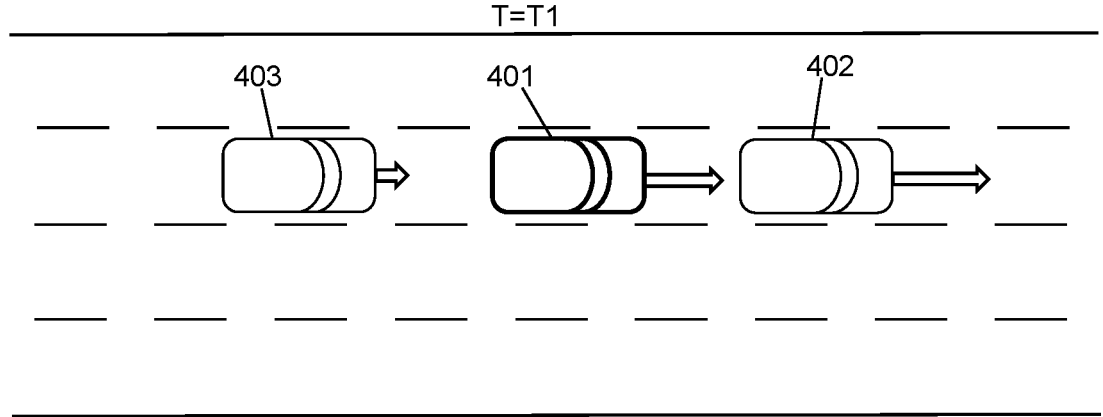
Figure 4:
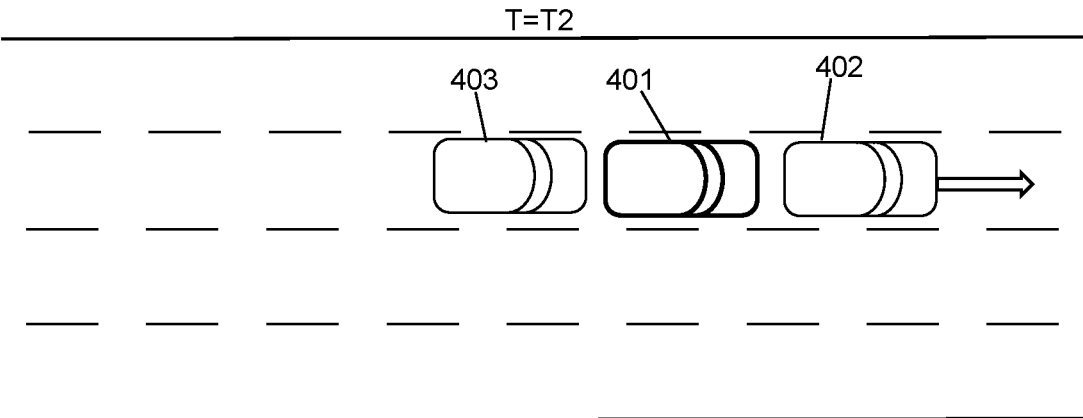

FIG. 4 is a sketch showing an exemplary embodiment of a procedure for three vehicles to avoid a collision, according to some embodiments. As depicted in this non-limiting example, a first, second, and third vehicle 401-402-403 are in line on a highway 400 when, at T0, the first vehicle 401 determines that it is going faster than the second vehicle 402 and begins to slow down. To avoid being rear-ended, the first vehicle 401 sends an emergency message to the third vehicle 403 to slow down, and another emergency message to the second vehicle 402 to speed up. The first vehicle 401 knows the correct wireless address of the second and third vehicles 402-403 because, at an earlier time, all three vehicles acquired GPS signals simultaneously and they, or one of them, analyzed those signals differentially to determine each vehicle's position in association with the vehicle's wireless address. Accordingly, the third vehicle 403 receives the emergency message correctly addressed to it and, at T1, has begun slowing down as directed. Likewise, the second vehicle 402 has received the acceleration request and has speeded up, giving the others crucial extra seconds to decelerate.

At time T2, the first and third vehicles 401-403 have decelerated to match the second vehicle 402, thereby avoiding colliding. Thus a collision can be avoided (or at least mitigated) in almost every case by cooperative action among the participants, but only if each participant knows which wireless address belongs to which other vehicle.

Systems and methods for simultaneous GPS reception are described in the following examples.

Figure 5:
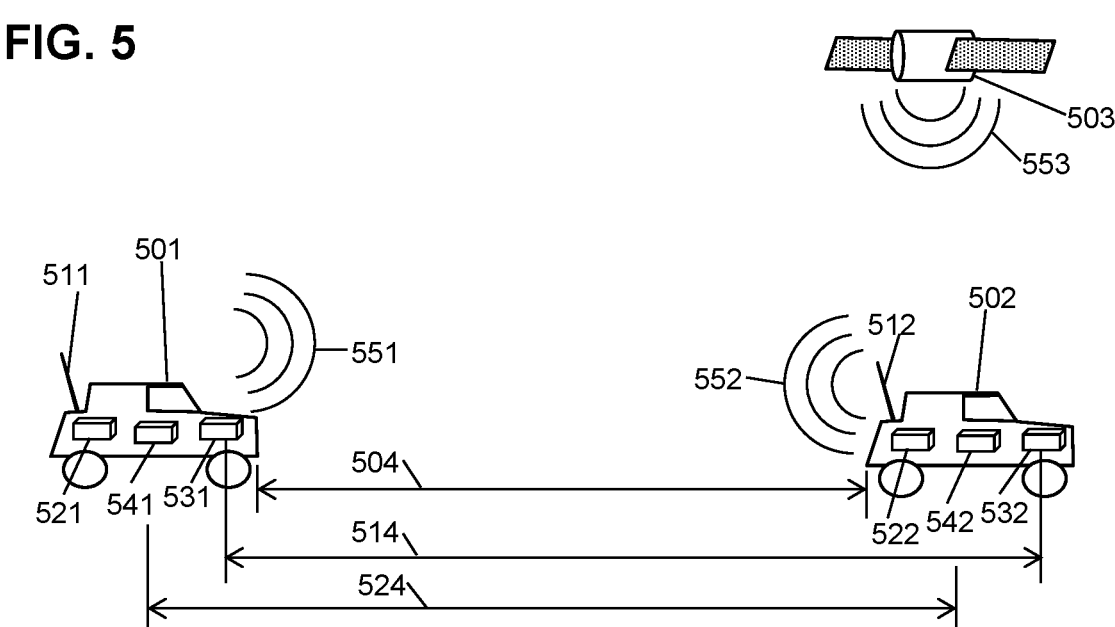
FIG. 5 is a schematic sketch showing an exemplary embodiment of vehicles cooperating to determine the distance between them, according to some embodiments.

FIG. 5 is a schematic sketch showing an exemplary embodiment of vehicles cooperating to determine the distances between them, according to some embodiments. As depicted in this non-limiting example, a first vehicle 501 and a second vehicle 502 are configured for wireless communication, reception of satellite navigation signals, and processing of localization data. The first vehicle 501 includes a first antenna 511, a first wireless transceiver 521, a first processor 541, and a first GPS (or other navigation type) receiver 531, while the second vehicle 502 includes a second antenna 512, a second transceiver 522, a second processor 542, and a second GPS receiver 532. The first vehicle 501 is configured to transmit a first wireless message 551 symbolized by waves, the second vehicle 502 is configured to transmit a second wireless message 552, and the navigation satellite 503 is configured to transmit GPS (or other navigation) signals 553.

Three distances between the vehicles are defined as follows: A distance Dmin 504 is the distance between the closest parts of the two vehicles 501-502, a distance Dnav 514 is the distance between the GPS (or other navigation) receivers 531-532, and a distance Dcentroid 524 is the distance between geometric centroids of the two vehicles 501-502. From a traffic-safety perspective, the important distance is Dmin 504, while for GPS signals the relevant distance is Dnav 514, and for visual scene interpretation, Dcentroid 524 may be most natural. Each vehicle 501-502 may include correction factors that translate between measurements based on the three distances 504-514-524, and other distances based on other sensors. Although such corrections have not been significant with prior-art low-resolution localization, the improved precision enabled by the systems and methods disclosed herein may necessitate such distance corrections, according to some embodiments.

In the depicted example, the first and second vehicles 501-502 may initially communicate to agree upon a plan to simultaneously receive GPS signals 553. For example, the first vehicle 501 (the "planning" vehicle) may broadcast a first message 551 indicating, for example, a particular time at which the vehicles 501-502 may receive GPS signals 553 from a particular satellite 503. The second vehicle 502 may reply with a message 552 agreeing to the plan. Alternatively, the second vehicle 502 may remain silent and not respond, since there is no need to clutter the bandwidth with unnecessary messaging. If the second vehicle 502 cannot comply with the original plan, it can propose a different plan, or decline to participate, or otherwise respond, or not respond.

The first and second vehicles 501-502 then receive (or attempt to receive) the same satellite signal 553 at their respective GPS receivers 531-532 at the specified time, and then exchange messages 551 or 552 including data derived from the received satellite signals 553. For example, the second entity 502 may determine timing data from the received satellite signal 553, and may then transmit a message including that data to the first vehicle 501. Then, using the processor 541, the first vehicle may analyze the data received from the second vehicle 502 along with data derived from its own reception of the satellite signals 553, determining a differential between the two data sets, and may thereby derive a distance, such as Dnav 514, related to that differential.

The analysis of the combined data may be configured to negate errors. For example, the first processor 541 may be configured to calculate a differential or difference between the signals received by the first and second 501-502 vehicles, and may derive a distance between the vehicles (or a component of that distance) from the observed difference between the two signals. For example, the data may include a time of arrival, or a difference in the times of arrival, of a particular signal feature in signals from two different satellites positioned at opposite sides of the sky. The arrival times of those two signal features, and their differential, may be different for the first and second vehicles 501-502, due to their different distances from the satellite 503. The distance Dnav 514 is related to that time difference by trigonometry. For example, if a particular satellite 503 is positioned along the line between the two vehicles 501-502, then Dnav may equal that time difference divided by the speed of light. If the satellite 503 is positioned at an angle relative to the line between the vehicles, then the distance is related trigonometrically to that angle. In addition, by simultaneously receiving further signals from other navigation satellites (at least three, preferably four satellites), the vehicles can differentially analyze those signals as well, and thereby determine a two-dimensional location of the second vehicle 502 relative to the first vehicle 501.

If the two vehicles 501-502 acquire satellite navigation signals at the same time from the same satellites, then improved precision may be obtained by subtracting the time of arrival of a particular signal feature at the first and second GPS receivers 531-532 for the satellites received. In some embodiments, it may not be necessary for the vehicles to include a precision time-base because the differences between arrival times of satellites at various positions in the sky are sufficient to determine the relative positions of the vehicles. Differential analysis is often more precise than calculating a first distance of the first vehicle 501 from the satellite 503 and a second distance of the second vehicle 502 from the satellite 503, and then subtracting those two large distances to obtain the small distance between the vehicles. In addition, other errors may cancel each other in the differential calculation, such as errors due to satellite motion or satellite time-base errors, which are the same for the two vehicles' data sets, and therefore cancel in the differential. Since it is not necessary, in this example, to determine the absolute latitude and longitude of the vehicles, the differential distance Dnav may be determined to greater precision as a result of the cancellation of the common distortions when the signals are acquired at the same time from the same satellite signals. In addition, it may not be necessary to calculate the distance to the satellite 503, nor to determine other parameters related to absolute location, thereby saving time and canceling further sources of uncertainty such as errors due to vehicle motion and satellite motion, vehicle time-base errors and satellite clock errors, uncertainties in satellite position and its motion versus time, and many others that cancel in the differential. The simultaneous acquisition may thereby enable a more precise determination of the relative distance between the two vehicles 501-502, and in their two-dimensional location of the second vehicle 502 relative to the first vehicle 501, than provided by separate uncoordinated acquisitions, according to some embodiments.

As used herein, the two entities detect satellite signals "simultaneously" if the entities detect the same signals as closely in time as possible, given the finite speed of the signals. For example, if the vehicles are 300 meters apart, and if a satellite is in line with the vehicles, then the satellite signal will reach one of the vehicles about 1 microsecond later than the other vehicle. If both vehicles detect the same feature of the same signal from the same satellite, then the vehicles are said to have detected simultaneously, notwithstanding the signal propagation time between vehicles. However, that timing differential is directly related to the distance between the vehicles, and this relationship is independent of the distance to the satellite, the motion of the vehicles, the motion of the satellite, the stability of the satellite's time-base, and many other cancelling uncertainties.

In some embodiments of the systems and methods, any number of vehicles (or other wireless entities) may be in radio range of each other, and may be configured to exchange messages specifying data from three or more data sets acquired from three or more navigation satellites. For example, a first vehicle may broadcast a planning message specifying a time at which the vehicles will acquire signals from each of those satellites. The participating vehicles can then acquire the various signals from the specified satellites at the specified time in the specified order. Each of the vehicles may then derive data from the signals that they individually detect, and may transmit their reply messages to the first vehicle (or to another calculating entity such as a roadside access point), specifying that data. For example, each vehicle can include, in the data, a time difference between the arrival of a specific feature of the signals from each of the satellites, the time difference being measured to sufficient precision (such as 1-2 nanoseconds, for example) that the planning entity can derive relative positions of the vehicles by comparing those time differences. The vehicles may also include, in the planning message and the reply messages, each entity's wireless address, so that the vehicles can communicate with each other thereafter.

The first vehicle (or multiple vehicles, or a fixed entity) can then calculate the locations of each other participating vehicle, relative to the first vehicle or a central vehicle or some other basis, for example. The first vehicle may then broadcast a "locations" message including the calculated position map showing each participating vehicle's position along with its wireless address. Then, after receiving the locations message, the participating vehicles can then refer to the position map to determine which wireless address goes with which physical vehicle, and can thereby communicate with and coordinate with the other vehicles.

The coordinate system of the position map may be related to a geographical coordinate system such as north and south, or it may be based on the direction of travel of the first vehicle, or it may be relative to the direction of the road that the vehicles are on. The position map may be a list of Cartesian coordinates and wireless addresses, for example. The coordinates may be the (X, Y) coordinates of each participating vehicle, in meters or in 10-cm units, relative to the first vehicle, with the X coordinate measured parallel to the road and the Y coordinate perpendicular to the road, for example. Alternatively, or in addition, the first vehicle (or other entity) may broadcast a message including a coordinate listing of the vehicle positions. Alternatively, the calculating entity may prepare a two-dimensional map as an image for example, or other format.

Calculating the location of a vehicle, relative to another vehicle, based on differential analysis of the simultaneously acquired data, may include a fitting step. When a location is determined redundantly by multiple independent measurements, the separate determinations generally disagree with each other due to measurement uncertainty and roundoff errors and the like. The first vehicle (or other calculating entity, such as a roadside computer) may process the measurements using a fitting function such as averaging the values, or performing a least-squares fit, or a maximum-likelihood fit, or an outlier-free mean-value fit, or other type of combination of the values. An artificial intelligence model, trained by machine learning using a large number of traffic location scenarios, may be employed to perform the location analysis based on the individually measured satellite data sets, including fitting the over-determined coordinates of the vehicles and other participating entities. A land-based access point or base station, or a remote supercomputer in communication with the roadside assets, may assist by solving the location fit rapidly.

Differentially analyzing the data acquired from multiple vehicles, and adjusting the two-dimensional fitting function for each vehicle's coordinates relative to the first vehicle, for example, is a complex problem. Artificial intelligence (AI) may be well-suited to determining the relative positions of the vehicles according to the satellite signals, due to the ability of some AI models to account for a wide range of parameters that may be mutually under- or over-determined or otherwise conflicted. For example, a software AI structure, such as a neural net, may be configured in a supercomputer, to accept as inputs the data acquired by each of the vehicles for each of the satellites, and to calculate a maximum-likelihood (or other fitting type) solution for the relative positions of the vehicles. Adjustable variables in the AI structure may be varied to incrementally and iteratively improve the accuracy of a predicted distance, for example, by comparing the predicted distance to the actual measured distance between vehicles. When adjusted to provide sufficiently accurate relative position measurements, the AI structure may be termed an AI model since it can then perform a useful task.

In some embodiments, the AI model may be too large and unwieldy for use by a busy vehicle processor. Therefore, a smaller and simpler algorithm may be derived from the successful AI model, by freezing the adjustable variables in beneficial values, and/or removing ("pruning") the non-productive inputs and functions. Alternatively, the algorithm may be configured as a different type of calculation tool, such as a table of values that can be interpolated, a computer program that emulates the AI model, an analytic function or set of functions, or other way of calculating the relative positions of the vehicles according to the satellite data.

Due to the potentially large number of inputs and adjustable variables in the model, and the very large amount of training data likely needed for convergence of the model, the AI structure is preferably prepared in a supercomputer. The supercomputer may be a classical semiconductor-based computer, with sufficient speed and thread count and processor count to perform the model training in a feasible amount of time. Alternatively, the supercomputer may be a quantum computer having "qbits" or quantum bits as its working elements. Quantum computers may provide special advantages to solving AI models because they can very rapidly explore a complex terrain of values, such as the highly interrelated effects of the various inputs on the output results. Therefore, the systems and methods include a quantum computer programmed to include an AI structure and trained on a large number of traffic scenarios in which vehicles acquire navigation-satellite signals synchronously and perform differential analysis on the data sets.

The participating vehicles, after receiving the location message in which the vehicle locations are associated with their wireless addresses, can then communicate with each other "specifically", that is, transmitting messages unicast to a particular vehicle selected from the surrounding traffic. In addition, the location data may assist a hazard-avoidance program in each vehicle, for detecting imminent collisions and devising evasion strategies. In addition, with knowledge of the wireless addresses of each participating vehicle in proximity, the vehicles may thereby cooperate for collision avoidance and traffic management, in ways that may not be possible absent the disclosed systems and methods.

Figure 6:
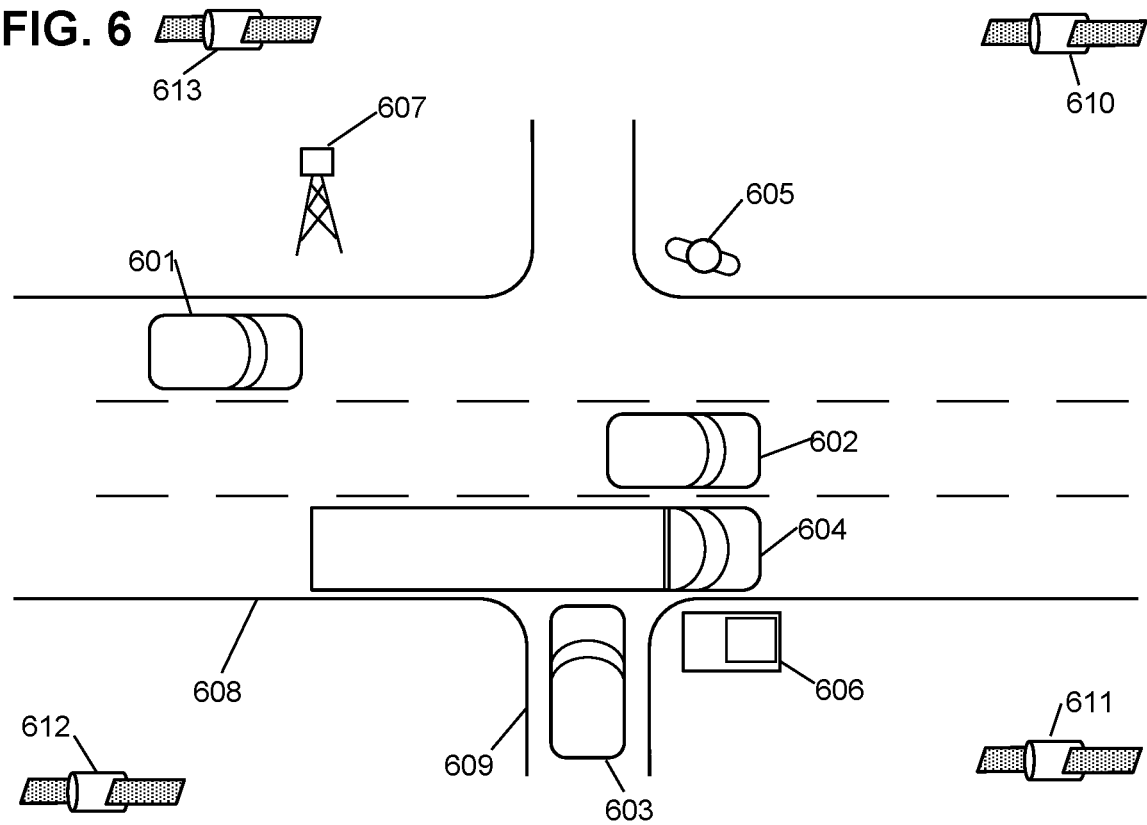
FIG. 6 is a schematic sketch showing an exemplary embodiment of a traffic scene including wireless entities configured to determine locations by simultaneous acquisition of satellite signals, according to some embodiments.

FIG. 6 is a schematic sketch showing an exemplary embodiment of a traffic scene including wireless entities configured to determine locations by simultaneous acquisition of satellite signals, according to some embodiments. As depicted in this non-limiting example, a multi-lane highway 608 includes vehicles rendered as cars 601 and 602, and a truck 604. On a connecting street 609 is another vehicle 603. Near the highway 608 is a pedestrian 605 with a mobile phone, an automatic wireless tollbooth 606, and a roadside access point or base station 607. All of those entities 601-607 are in wireless communication with each other on, for example, a sidelink or other predetermined frequency, and are also configured to detect signals, such as GPS (or other satellite) signals. Overhead at various angles are four navigation satellites 610, 611, 612, and 613, such as GPS satellites.

A planning entity, such as vehicle 601 or the access point 607, initially broadcasts a planning message to all receivers in range, suggesting a synchronized acquisition of satellite signals at a particular time relative to the planning message, such as 100 microseconds or 10 milliseconds after the planning message ends, for example. The planning message may specify that signals are to be acquired from particular satellites, such as satellites 610-613, receiving each satellite's signal at a particular time according to the satellite's transmission schedule. The planning message may include specifications about how the signals are to be analyzed (such as detecting and relative timing a particular feature of the signals) and how the data (such as the timing of the feature) is to be returned to the planning entity. The entities 601-607 may then acquire the satellite signals from the specified satellites 610-613 at the specified times. Each entity may then reduce the received signals to specific data values of parameters needed for the relative location determination, such as the arrival times (or time differences) of a particular feature or phase of each satellite signal. The entities may then transmit data messages indicating the data thereby obtained. To avoid message interference among the data messages, the entities may monitor the channel during an LBT (listen-before-talk) interval before transmitting. The LBT interval may be a randomly selected interval, within a predetermined maximum time interval. Alternatively, the entities may have agreed as to the order in which they will report their data values, or they may have been assigned separate frequencies or bands for each entity, among other ways to avoid message interference. If a message interference occurs, then the planning entity or other entity may request a retransmission.

After receiving the data messages from the participating entities, the planning entity may analyze the various data sets to determine the relative positions of the entities. The planning entity may be configured to perform the location calculations in a differential manner, configured to cause certain errors or uncertainties to cancel each other. For example, the planning entity may be configured to subtract corresponding data values from two (or more) of the entities to obtain a differential value, and may then calculate a relative distance, or coordinate displacement, between those two entities according to the differential value (along with other data, such as angles to satellites). In addition, if multiple participating entities are present, the planning entity may be configured to perform a fit or weighted average or the like, in which the location of each entity may be determined by combining multiple distance measurements according to each of the participating entities and each of the satellites. The planning entity may thereby derive a maximum-likelihood or other improved location determination for each participating entity, which may be more precise than any of the contributing values individually, according to some embodiments. The planning entity may then assemble the various positions relative to, for example, the planning vehicle, as a position map, and may broadcast the position map with locations thus obtained. In addition, each vehicle's coordinates in the coordinate listing (or its location in the position map) may be annotated with that vehicle's wireless address.

Many advantages may result from the improved relative position determinations. For example, in the depicted scenario, vehicle 601 may be prepared to take violent evasive actions if the pedestrian 605 is in the roadway 608. However, if a precision determination of the pedestrian's location indicates it is not encroaching the highway 608, then the vehicle 601 may proceed safely in lane and avoid a risky swerve maneuver. If the precision location determination reveals that the pedestrian 605 has indeed stepped onto the highway 608, then the precision location determination may provide the approaching vehicle 601 with sufficient time to swerve or stop safely. Sufficiently precise data may enable the vehicle 601 to manage the maneuver with minimum risk to itself, and may thereby save the errant pedestrian's life.

Ordinary GPS signals, with a resolution of a few meters typically for moving vehicles, may not be sufficient in general to indicate whether the pedestrian is in the lane or on the side. Therefore it is essential that the oncoming vehicles obtain sufficiently precise location information as soon as possible, so that an emergency avoidance maneuver (with its risks) can be executed in time.

The precision location determination may also be necessary to separate closely-spaced entities. For example, the nearest surfaces of the truck 604 and the passing car 602 may be less than a meter of each other, which is below the resolution normally provided by non-differential, non-simultaneous, individual GPS. Improved spatial resolution, and especially improved determination of distances between entities, may be necessary to separate them, without which it may be impossible to form an accurate map of the local traffic.

Autonomous or semi-autonomous vehicles depend on continuous traffic situation awareness for control and safety. But in the present example, at least some of the entities are obscured from the sensors and cameras of other entities, and therefore cannot be included accurately in the local traffic map. Vehicle 601 is unable to detect the waiting car 603 or the toll booth 606, for example. The location message may list the coordinates of all those entities, thereby revealing hidden entities and providing a more complete map of the traffic scenario.

In some embodiments, the access point 607 may be the planning entity, configured to transmit the planning message, acquire satellite signals at the specified time, and receive the data messages of the other entities. The access point 607 may perform differential analysis on the vehicles' data relative to the access point's received signals, determining the spatial distribution of the vehicles and other entities relative to the location of the access point. The access point 607 can also perform fitting on the overdetermined values, such as a maximum-likelihood fitting for example, and can then broadcast the location results to the other entities. Since the computing power of the land-based and stationary access point 607 is likely far better than most mobile processors, the access point 607 may be able to provide a more accurate determination, and faster, than the mobile entities could. In addition, the access point can broadcast the coordinate listing formatted as the geographical latitude and longitude of each vehicle, by adding the access point's previously determined coordinates to the relative position coordinates of each vehicle. In addition, the access point 607 may be in communication with other fixed assets, such as other base stations or access points upstream and downstream on the highway, and can compare the current traffic distribution with earlier traffic determinations upstream. This may reveal problems or emerging hazards, and may provide improved location resolution at the current site, for example. In addition, the access point 607 may be able to communicate with one of the vehicles according to the location and address information thus determined, for example to warn the vehicle of a hazard. A further advantage of the access point 607 doing the analysis may be that the vehicles would be minimally distracted, since they would be required only to acquire the satellite signals at the specified time and transmit the data results or timing parameters to the access point 607. Assisted by the roadside access point's computers, the vehicles may obtain traffic awareness including localization and identification of surrounding vehicles, while focusing primarily on operating the vehicle instead of analyzing group data.

FIG. 7 is a flowchart showing an exemplary embodiment of a procedure for vehicles to avoid a collision, according to some embodiments. As depicted in this non-limiting example, at 701 a first vehicle (or other entity such as a roadside access point) broadcasts a planning message specifying particular navigation satellites and a particular time at which the satellite signals can be acquired, For example, the specified acquisition time may be in the range of 10 microseconds to 1 second following the start or end of the planning message, or other delay time configured to match a scheduled transmission time of the satellite or satellites. At 702, the other vehicles in proximity receive the planning message. The other vehicles may acknowledge or they may remain silent. Acknowledgement may be unnecessary in most cases. At the specified time, each vehicle acquires the satellite signals as directed. At 703, each vehicle analyzes the satellite signals to determine a characteristic parameter such as a timing or phase or other feature of the signals, related to the vehicle's location. At 704, each vehicle transmits a data message indicating the characteristic parameter (or parameters) as well as the wireless address of that vehicle. At 705, the first vehicle analyzes the various data sets. For example, the first vehicle may subtract or differentially compare the characteristic parameters determined by each of the vehicles, and thereby determines a relative location for each of the vehicles instead of a global geographic location. For example, the location of one vehicle may be determined relative to, say, the planning entity or other reference point, thereby canceling many uncertainties and measurement errors.

The orientation of the location distribution may be relative to the direction of the road or the travel direction of the first vehicle or a geographical direction, for example. In addition, if multiple vehicles are participating, each location coordinate is likely to be overdetermined by multiple independent measurements. In that case, the first vehicle may apply an averaging or fitting function to obtain a self-consistent distribution of locations of the vehicles. In addition, optionally, the vehicle locations may be adjusted to indicate the locations of the vehicle centroids instead of the location of the GPS receiver (the vehicles may indicate this correction in their data messages so that the first vehicle can add or subtract it from the values in the position map or coordinate listing). At 706, the first vehicle broadcasts a location message indicating the location coordinates of each vehicle (relative to the first vehicle in this case) along with each vehicle's wireless address.

At 707, the vehicles continue to monitor the positions of proximate vehicles as they proceed along the road using, for example, cameras or other sensors, and may thereby keep track of which vehicle has which wireless address as they move. Later, at 708, a third vehicle detects an imminent hazard such as a collision involving a fourth vehicle. The third vehicle knows the wireless address of the fourth vehicle because they were both listed in the location message, and therefore at 709 the third vehicle transmits an emergency message to the fourth vehicle requesting immediate evasion to avoid the collision. At 710, the fourth vehicle complies, the collision is avoided, and a life is saved as a result of precisely determining vehicle locations by simultaneous GPS as disclosed herein.

In general, the systems and methods disclosed herein are configured to provide relative distance and/or location determinations of vehicles and other wireless entities, using procedures in which common errors and uncertainties cancel. The procedures can provide improved localization precision and thereby identify each vehicle in proximity when combined with the determined wireless address of the vehicle. Such high-precision localization can greatly assist a collision-avoidance software by enabling improved trajectory calculations and improved near-miss determination, according to some embodiments. Higher localization precision can also provide earlier detection of imminent collisions, and therefore additional time to implement an avoidance or mitigation strategy, with lower risk involved in that strategy. Hence, fewer accidents may ensue, and less harm in each remaining collision, than would be possible absent the disclosed methods and systems.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the vehicle, an inserted memory chip, hard drive, flash drives, flash memory, optical media, magnetic media, or any other type of file-storing medium. The outputs may be delivered to a user by way of signals transmitted to vehicle steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where vehicle controls are contemplated, the plural inputs may allow plural users to input relevant data at the same time.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a processor comprising an AI (artificial intelligence) model to determine a distance between vehicles, the method comprising:
   a) selecting, by a first vehicle, a plurality of times and frequencies according to a planned transmission schedule of a global navigation satellite system;
   b) transmitting, by the first vehicle, to a second vehicle, a planning message specifying the plurality of times and frequencies;
   c) acquiring, by the first and second vehicles, simultaneously, at times and frequencies according to the plurality of times and frequencies, navigation satellite signals;
   d) transmitting, by the second vehicle, measurement data derived from the navigation satellite signals;
   e) providing, as input to the AI model, the navigation satellite signals acquired by the first vehicle and the measurement data transmitted by the second vehicle; and
   f) determining, as output from the AI model, a two-dimensional position of the second vehicle relative to the first vehicle.

2. The method of claim 1, wherein the AI model is a neural net.

3. The method of claim 1, wherein the AI model is a hidden Markov model.

4. The method of claim 1, wherein the processor comprising the AI model is in the first vehicle.

5. The method of claim 1, wherein the processor comprising the AI model is in a fixed location and is in wireless communication with the first vehicle.

* * * * *